United States Patent
Klein et al.

(10) Patent No.: US 10,487,671 B2
(45) Date of Patent: Nov. 26, 2019

(54) METHOD OF FABRICATING A REINFORCING EDGE FOR A BLADE AND REINFORCING EDGE OBTAINED BY THE METHOD

(71) Applicant: SNECMA, Paris (FR)

(72) Inventors: Gilles Charles Casimir Klein, Méry-sur-Oise (FR); Léon Tham, Saint Denis (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 27 days.

(21) Appl. No.: 14/914,947

(22) PCT Filed: Aug. 22, 2014

(86) PCT No.: PCT/FR2014/052112
§ 371 (c)(1),
(2) Date: Feb. 26, 2016

(87) PCT Pub. No.: WO2015/028749
PCT Pub. Date: Mar. 5, 2015

(65) Prior Publication Data
US 2016/0201481 A1    Jul. 14, 2016

(30) Foreign Application Priority Data

Aug. 29, 2013 (FR) ..................... 13 58272

(51) Int. Cl.
*F01D 5/28* (2006.01)
*F01D 5/00* (2006.01)
(Continued)

(52) U.S. Cl.
CPC ............... *F01D 5/282* (2013.01); *B21K 3/04* (2013.01); *B23P 15/04* (2013.01); *F01D 5/00* (2013.01);
(Continued)

(58) Field of Classification Search
CPC .......... F01D 5/282; F01D 5/288; B23P 15/04; F04D 29/324; F04D 29/023; B21K 3/04;
(Continued)

(56) References Cited

U.S. PATENT DOCUMENTS 4,655,246 A  4/1987 Phlipot et al.
5,887,332 A * 3/1999 Champenois ....... B29C 37/0082
                                                  264/258

(Continued)

FOREIGN PATENT DOCUMENTS

CN    102639287 A   8/2012
CN    102947596 A   2/2013
(Continued)

OTHER PUBLICATIONS

English Translation of Search Report dated Dec. 9, 2014, in corresponding International PCT Application No. PCT/FR2014/052112, filed on Aug. 22, 2014 (3 pages).
(Continued)

*Primary Examiner* — Rick K Chang
(74) *Attorney, Agent, or Firm* — Bookoff McAndrews, PLLC

(57) ABSTRACT

A method of fabricating a reinforcing edge (10') of a turbine engine blade (70) in which there is provided a blank (10) of the reinforcing edge and an indentation is imprinted in said blank so as to form a rough surface (S). A reinforcing edge (10') obtained by such a method.

13 Claims, 1 Drawing Sheet

(51) Int. Cl.
*B23P 15/04* (2006.01)
*B21K 3/04* (2006.01)
*F04D 29/02* (2006.01)
*F04D 29/32* (2006.01)
*B21D 53/78* (2006.01)

(52) U.S. Cl.
CPC ........... *F01D 5/288* (2013.01); *F04D 29/023* (2013.01); *F04D 29/324* (2013.01); *B21D 53/78* (2013.01); *F05D 2220/30* (2013.01); *F05D 2230/23* (2013.01); *F05D 2230/25* (2013.01); *F05D 2230/90* (2013.01); *F05D 2240/121* (2013.01); *F05D 2240/122* (2013.01); *F05D 2240/303* (2013.01); *F05D 2240/304* (2013.01); *F05D 2250/75* (2013.01); *F05D 2300/516* (2013.01); *F05D 2300/603* (2013.01); *Y02T 50/672* (2013.01); *Y02T 50/673* (2013.01)

(58) Field of Classification Search
CPC ........... F05D 2220/30; F05D 2300/603; F05D 2230/90; F05D 2230/23; F05D 2250/75; F05D 2300/516; F05D 2230/25; F05D 2240/121; Y02T 50/673; Y02T 50/672
See application file for complete search history.

(56) References Cited

U.S. PATENT DOCUMENTS

| | | | |
|---|---|---|---|
| 6,807,838 | B2 | 10/2004 | Iwaya |
| 7,229,253 | B2 * | 6/2007 | Broderick ............... B23P 6/002 416/225 |
| 8,449,784 | B2 | 5/2013 | Parkos et al. |
| 2002/0068108 | A1 | 6/2002 | Iwaya |
| 2012/0233859 | A1 | 9/2012 | Cattiez et al. |
| 2012/0317810 | A1 | 12/2012 | Klein et al. |
| 2013/0089428 | A1 * | 4/2013 | Hottier ................... B21K 3/04 416/223 R |

FOREIGN PATENT DOCUMENTS

| | | |
|---|---|---|
| EP | 2 469 025 A2 | 6/2012 |
| FR | 2 956 602 A1 | 8/2011 |
| FR | 2 961 866 A1 | 12/2011 |
| FR | 2 970 668 A1 | 7/2012 |
| FR | 2972127 A1 | 9/2012 |
| JP | H06-058413 U | 8/1994 |
| JP | 2006-049242 A | 2/2006 |
| JP | 2009-074642 A | 4/2009 |
| JP | 2010 255451 A | 11/2010 |
| JP | 2011-052240 A | 3/2011 |
| JP | 2013-513055 A | 4/2013 |
| RU | 2297538 | 4/2007 |
| WO | WO 2005/071362 | 8/2005 |
| WO | WO 2011/064406 A1 | 6/2011 |
| WO | WO 2012/101356 A1 | 8/2012 |

OTHER PUBLICATIONS

English translation of Office Action and Search Report dated Jun. 27, 2018, in corresponding Russian Application No. 2016111329 (6 pages).
English translation of Office Action dated Jul. 31, 2018, in corresponding Chinese Application No. 201480047953.1 (6 pages).
Hou, Wei, "Metalworking practice," Huazhong Science and Technology University Press, Mar. 2013, pp. 57-60.
Ning, Tonghai, "Questions and Answers on Mold Practical Technology," Mechanical Industry Press, May 2013, pp. 2-8.
English translation of Office Action dated Mar. 5, 2019, in corresponding Japanese Application No. JP2016-537361 (4 pages).
English translation of Office Action dated Jun. 5, 2018, in corresponding Japanese Application No. 2016-537361 (4 pages).
Communication of the European Patent Office dated Dec. 11, 2018, in corresponding EP Application No. 14786975.4 (7 pages).

* cited by examiner

METHOD OF FABRICATING A REINFORCING EDGE FOR A BLADE AND REINFORCING EDGE OBTAINED BY THE METHOD

CROSS-REFERENCE TO RELATED APPLICATIONS

This application is the U.S. national phase entry under 35 U.S.C. § 371 of International PCT Application No. PCT/FR2014/052112, filed on Aug. 22, 2014, which claims priority to French Patent Application No. FR 1358272, filed on Aug. 29, 2013, the entireties of each of which are incorporated by reference herein.

FIELD OF THE INVENTION

The present description relates to a method of fabricating a part and to a part obtained by the method.

More particularly, said part may be a reinforcing edge for a turbine engine blade. Such a reinforcing edge may be fitted to any type of terrestrial or aviation turbine engine, and in particular to a helicopter turboshaft engine or to an airplane turbojet engine.

BACKGROUND OF THE INVENTION

Turbine engine blades are subjected to high levels of mechanical stress, associated in particular with their speed of rotation, while also being required to satisfy strict conditions concerning weight and size. One of the options envisaged for lightening blades is to use a composite material for fabricating them. Nevertheless, turbine engine blades must also satisfy severe utilization criteria, and in particular they must withstand abrasion and impacts against foreign bodies. For example, a front fan blade of an airplane turbojet must withstand abrasion in flight and must also withstand impacts against birds struck in flight. Unfortunately, when the leading edge of a blade is made of the same composite material as the body of the blade, the leading edge runs the risk of presenting insufficient resistance to abrasion or to impacts.

In order to resolve this problem, proposals have been made to consolidate the leading edge of a blade by fitting a separate part on the body of the blade, which part becomes incorporated in the aerodynamic profile of the blade. Such a separate part is referred to as a reinforcing edge.

A reinforcing edge is generally a solid part extending longitudinally along a substantially radial direction relative to the axis of rotation of the engine, and in cross-section it presents a profile that is generally Y-shaped, with a central portion of considerable thickness between tapering branches. The reinforcing edge thus presents a longitudinal central portion of considerable thickness, referred to as a "nose", lying between thin longitudinal flanks.

The thickness of such a reinforcing edge thus varies, typically going from several millimeters in the central portion to only a few tenths of a millimeter (about 0.2 mm) at the ends of the tapering branches.

A reinforcing edge may be used to reinforce the leading edge or the trailing edge of a blade. It must therefore present a shape that matches its location, for example a shape that is twisted and cambered, being complementary to the shape of the edge of the blade body on which it is fastened.

Finally, on its outside face, a reinforcing edge needs to present a surface state that is smooth in order to avoid harming the aerodynamic properties of the blade, while on its inside face it needs to present a radius of curvature of good quality so as to be a close fit on the edge of the blade body on which it is fastened.

It is known, e.g. from patent application FR 2 961 866, to fabricate reinforcing edges by hot-shaping and machining a part made out of titanium alloy. The reinforcing edge is then assembled to the blade body, generally by adhesive, in order to form a blade. Nevertheless, the blade as obtained in that way can present cohesion that is insufficient. Under such circumstances, the stresses to which the blade is subjected can lead to the reinforcing edge separating from the blade body.

There therefore exists a real need for a fabrication method that is suitable for fabricating a reinforcing edge for a turbine engine blade that presents increased ability for cohesion with the blade body.

SUMMARY OF THE INVENTION

The present disclosure provides a fabrication method for fabricating a reinforcing edge of a turbine engine blade, the method comprising the following steps:
  providing a blank for the reinforcing edge;
  imprinting an indentation in said blank so as to form a rough surface.

The blank of the reinforcing edge may be forged or machined before or after the step of imprinting the indentation. The forging or machining may include steps of cambering, ramming, extrusion, or any combination of these three operations. The blank is generally a part made of titanium alloy.

In the present disclosure, the term "rough surface" is used to designate the surface that is specifically modified by the step of imprinting the indentation. Thus, the rough surface designates exclusively the imprinted surface, even though the blank may present other surfaces that are not imprinted but that nevertheless present a degree of roughness. When the blank is imprinted in a plurality of locations, the term "rough surface" may also cover all of the imprinted surfaces, whether or not they are contiguous.

The rough surface is the surface for assembling to a blade body, e.g. by adhesive, once the blank has been fully shaped in order to obtain a reinforcing edge. The method thus serves to optimize the surface state of the blank on its portion that is to receive adhesive, i.e. its rough surface, so as to improve its cohesion with the blade body. The ability of the blade to withstand stresses in the reinforcing edge is thus increased by the method.

Furthermore, because of its small number of steps, the method can easily be incorporated in a production line. The method is therefore not onerous to implement industrially.

In some embodiments, the method includes an additional step consisting in deforming at least the rough surface of the blank so as to obtain the final shape of the reinforcing edge.

In such embodiments, the rough surface is deformed after the step of imprinting the indentation. The method is thus particularly advantageous for use with a reinforcing edge on which it would not be possible to imprint a rough surface if it were already in its final shape.

In some embodiments, the blank has a profile that is generally Y-shaped.

The blank thus extends in a longitudinal direction and its profile is seen transversely to that direction. The profile of the blank may comprise a thick central base from which two generally tapering branches extend. The central base may present one or more curves relative to the longitudinal direction.

In some embodiments, the rough surface is situated inside of the blank.

The term "inside of the blank" designates the surface that is to come into contact with the blade body, which body is generally received in a recess provided in the reinforcing edge. When the blank has a profile that is generally Y-shaped, the inside of the blank designates the surface situated between the top branches of the Y-shape, i.e. the surface defined by the facing sides of the branches of the Y-shape.

In some embodiments, the rough surface is imprinted inside the Y-shape blank and the branches of the blank are then deformed and/or moved towards each other. By such a method, the step of imprinting the indentation is performed while the branches are sufficiently spaced apart and while it is relatively simple to pass an imprinting tool. In certain circumstances, after the branches have been moved towards each other, the zone including the rough surface may be inaccessible to machining tools and imprinting the indentation is then impossible.

In certain embodiments, the imprinting step is performed by die-stamping between a first die and a second die, at least one of the two dies including a punch configured to imprint said indentation.

In certain embodiments, the punch is provided on a side of the surface of the blank which have the indentation imprinted therein. The punch thus possesses an indentation that is complementary to the indentation desired for the rough surface. In particular, the punch may present a degree of roughness that makes it possible to obtain the desired roughness for the rough surface. The roughness of the punch may be substantially equal to the roughness desired for the rough surface.

The roughness of the rough surface is created by the initial roughness of the blank, by transferring roughness from the punch, and by die-stamping contingencies (loss of roughness on imprinting, materials characteristics, etc.).

Other methods of imprinting, such as chemical machining, cover a narrow range of roughness and require the blank to be prepared in order to protect those surfaces that are not to be imprinted. In contrast, die-stamping makes it possible to imprint an indentation in a manner that is selective and localized, without any need to protect the other surfaces of the blank.

The roughnesses that can be achieved by die-stamping cover a wide range. In addition, once the punch has been made, die-stamping is an operation that is faster, more repetitive, and less expensive than chemical machining.

In some embodiments, the roughness of the rough surface lies in the range 1 to 20, and preferably in the range 3 to 10.

In the present disclosure, the term "roughness" designates the magnitude satisfying the following definition. Profiles of the rough surface are obtained by sectioning said surface on a plane, and the roughness of the rough surface is defined as the mean of the roughnesses of the profiles of said surface. The roughness of a profile is defined by the arithmetical mean deviations from the mean line, and is often written Ra. The value Ra as calculated over a defined evaluation length for which the profile is continuous, is equal to the arithmetical mean absolute values of the distances between each point of the continuous profile and a mean line of said profile over the evaluation length under consideration. By convention, roughness values Ra are expressed in micrometers (μm), and the unit is not stated.

The above-mentioned ranges of values ensure that the rough surface has an optimum surface state for being assembled with a blade body.

The present disclosure also relates to a fabrication method for fabricating a turbine engine blade, the method comprising the following steps:
providing a reinforcing edge made using the above-mentioned fabrication method;
providing a blade body; and
adhesively bonding all or part of the rough surface of the reinforcing edge to the blade body.

A turbine engine blade fabricated by this method may naturally have one or more reinforcing edges. For example, it may have two reinforcing edges, one acting as a leading edge and the other as a trailing edge.

A turbine engine blade fabricated by this method is particularly robust against stresses of all types, and in particular mechanical stresses. It presents increased cohesion between its reinforcing edge and its blade body.

In some embodiments, the blade body is made of organic matrix composite material. By way of example, it may be a composite blade body obtained by draping a woven material or by three-dimensional weaving. Still by way of example, the composite material used may be made by assembling woven carbon/plastics fibers with a resin matrix (e.g. a matrix made of epoxy, bismaleimide, or cyanate-ester resin), which assembly may be formed by means of a vacuum method of resin injection of the resin transfer molding (RTM) type.

The present disclosure also provides a turbine engine blade reinforcing edge having a surface, and in particular an inside surface, of roughness lying in the range 1 to 20, and preferably in the range 3 to 10.

Such a reinforcing edge thus presents a rough surface that is particularly suitable for assembling it to a blade body, as explained above.

In some embodiments, the reinforcing edge may present a Y-shaped profile as defined above. In certain embodiments, the rough surface may be on the inside of the reinforcing edge, i.e. the rough surface may correspond to all or part of the inside surface of the reinforcing edge.

The present disclosure also relates to a turbine engine blade including a reinforcing edge as described above. Such a turbine engine blade is particularly capable of withstanding stresses of all types, in particular mechanical stresses. It presents increased cohesion between the reinforcing edge and the blade body that makes it up.

BRIEF DESCRIPTION OF THE DRAWINGS

The invention and its advantages can be better understood on reading the following detailed description of embodiments of the invention given as non-limiting examples. The description refers to the accompanying drawing, in which:

FIG. 1 is a perspective view of an example of a blank 10 used for fabricating a reinforcing edge. In this example, the blank 10 is generally Y-shaped. Specifically, it has a central portion 40 of considerable thickness and two tapering branches 20 and 30 of smaller thickness. The central portion 40 extends in a longitudinal direction. It may present one or more curves in this longitudinal direction. The right branch 20 and the left branch 30 extend from the central portion 40.

Figure 1:
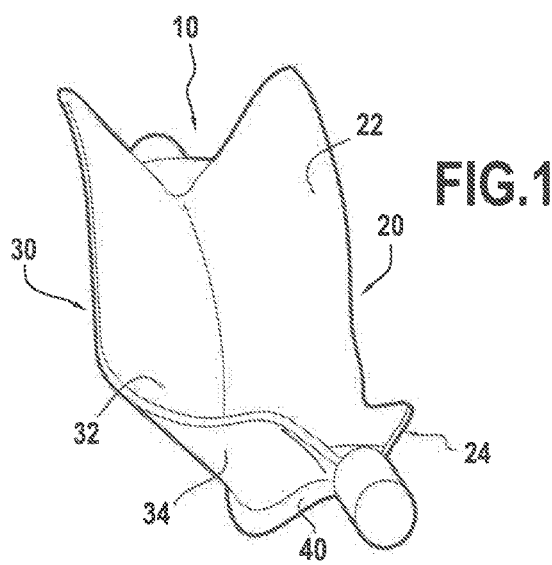
FIG. 1 is a perspective view of a blank for leading edge reinforcement.

The terms "left" and "right" are used solely with reference to the drawings, for reasons of clarity, and say nothing about the direction in which the blank is finally used.

The right branch 20 and the left branch 30 each have a respective inside face 22, 32 and a respective outside face 24, 34. The inside faces 22 and 32 face each other; in other words, the inside faces 22 and 32 form between them a salient angle, i.e. an angle of less than 180°.

Figure 2:
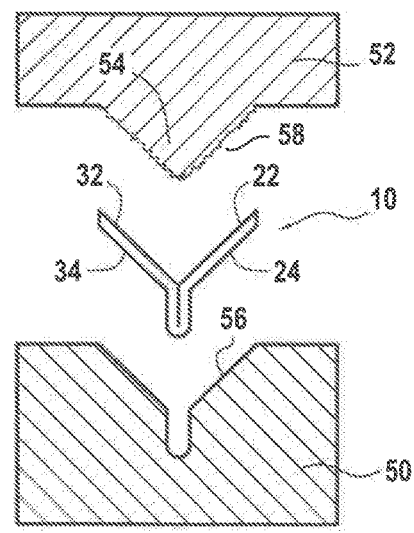
FIG. 2 is a diagram showing the step of imprinting an indentation on the blank.

During the method of fabricating the reinforcing edge, a rough surface is imprinted on the blank 10. For example, this imprinting may be performed by die-stamping. Such a die-stamping step is shown diagrammatically in FIG. 2. The blank 10 is placed between a first die 50 and a second die 52. The first die 50 has a first bearing surface 56 of shape complementary to the shape of the outside faces 24 and 34 and of the central portion 40 of the blank. The second die 52 has a punch 54 that is defined by a second bearing surface 58 of shape that is complementary to the shape of the inside faces 22 and 32. Thus, when the dies 50 and 52 are moved towards each other in order to press against the blank 10, the overall shape of the blank 10 is unchanged.

In this embodiment, the second bearing surface 58 of the punch 54 possesses an indentation that is complementary to the indentation it is desired to transfer by imprinting the inside of the blank. The inside of the blank is used to mean all or part of the inside faces 22 and 32. For example, the indentation of the second bearing surface 58 may merely be a surface of selected roughness. Furthermore, it is clear that if it is desired to imprint an indentation on the outside of the blank 10, e.g. on the outside faces 24 and 34, then it is the first bearing surface 56 rather than the second bearing surface 58 that needs to present an appropriate indentation.

Preferably, the step of die-stamping the blank 10 is performed under heat, i.e. during die-stamping, the blank 10 is at a temperature that is high enough to facilitate transferring the impression of the indentation. When using a titanium alloy, the temperature used for this step may for example be about 600° C.

By way of example, the punch 54 may be designed to be removable, so that it suffices to change the punch on a given die in order to change the type of indentation or in order to change the value of the imprinted roughness.

Furthermore, the surface of the punch 54 may be prepared by milling, in particular using a ball bur. Under such circumstances, adjusting the pitch of the milling determines the desired roughness dimension. At the end of the die-stamping step, the overall shape of the blank 10 remains unchanged but the blank 10 presents a rough surface S over all or part of its inside faces 22 and 32. The rough surface S imprinted by the second bearing surface 58 of the punch 54 presents the desired roughness.

Figure 3:
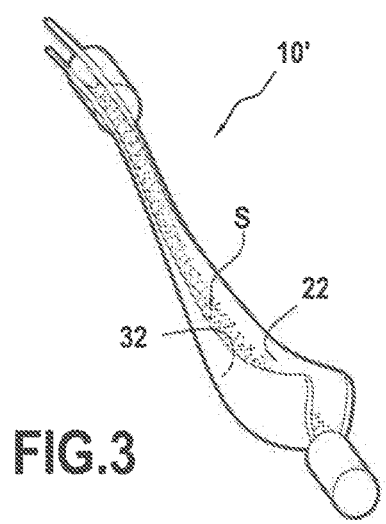
FIG. 3 is a perspective view of a reinforcing edge after deformation.

Thereafter, the blank 10 may be deformed so that it reaches its final configuration of a reinforcing edge 10'. Such a reinforcing edge 10' is shown in FIG. 3. Specifically, the deformed portions of the blank include the rough surface S carried by the inside faces 22 and 32. The deformation methods that can be used are well known to the person skilled in the art.

After deformation, the inside faces 22 and 32 may also be moved closer to each other than they were in the original blank (cf. FIG. 1). In the example of FIG. 3, they are almost parallel. The space defined between the inside faces 22 and 32 is small, which is why such a deformation operation is sometimes referred to as "closing". Furthermore, the reinforcing edge 10' is substantially more cambered and twisted in the longitudinal direction than was the blank 10.

It should be observed that it would be difficult to perform the above-described die-stamping step on a blank 10 having the final shape of the reinforcing edge 10', for at least the following reasons: firstly even assuming that inserting a punch 54 into the inside of the blank 10 were possible in spite of the inside of the blank being narrow, it would still be necessary to provide a punch 54 that is thin and cambered, which would be difficult to construct. Secondly, insofar as the force exerted for die-stamping acts only by its component that is locally normal to the surface of the blank 10, it would be necessary to press with a force that increases with increasing closure of the profile of the blank 10, i.e. the force would need to be greater when the branches 20 and 30 are close to each other.

Figure 4:
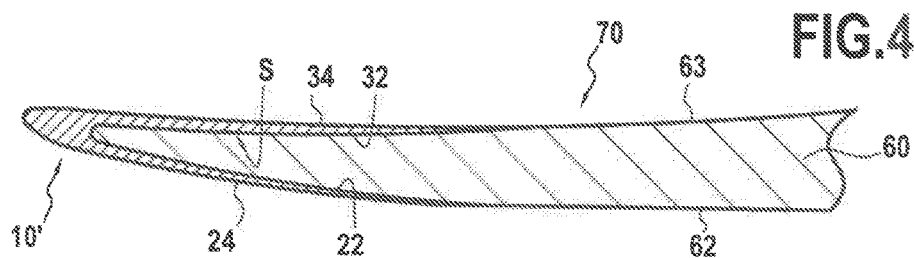
FIG. 4 is a fragmentary section view of a turbine engine blade.

The fabrication of a turbine engine blade may include providing a reinforcing edge 10' fabricated using the above-described method. For example, this reinforcing edge 10' may be a leading edge. As shown in FIG. 4, which is a fragmentary section view of a turbine engine blade 70, the reinforcing edge is subsequently assembled onto a blade body 60 that is configured to receive it. In other words, the outside shape of the blade body 60 may be complementary to the shape of the inside faces 22 and 32 of the reinforcing edge 10' so that they fit together perfectly. Bonding takes place via the rough surface S, and in particular it may be achieved by adhesive.

More precisely, the blade body 60 has a suction side face 62 and a pressure side face 63. The right inside surface 22 is adhesively bonded via its rough surface S to the suction side face 62, while the left inside surface 32 is adhesively bonded via its rough surface S to the pressure side face 63. The roughness of the rough surface S provides good cohesion of the adhesive between the reinforcing edge 10' and the blade body 60.

Although the present invention is described with reference to specific embodiments, modifications may be made to those embodiments without going beyond the general scope of the invention as defined by the claims. In particular, the individual characteristics of the various embodiments that are shown and/or mentioned may be combined in additional embodiments. Consequently, the description and the drawings should be considered in a sense that is illustrative rather than restrictive.

The invention claimed is:

1. A fabrication method for fabricating a reinforcing edge of a turbine engine blade, the method comprising the following steps:
   providing a blank for the reinforcing edge; and
   imprinting an indentation in said blank by die-stamping between a first die and a second die, wherein one of the first die or the second die includes a first rough surface, so as to form a second rough surface on the blank, at least one of the two dies including a punch configured to imprint said indentation, wherein the blank has a substantially Y-shape before the imprinting step.

2. The fabrication method as claimed in claim 1, including an additional step consisting in deforming at least the second rough surface of the blank so as to obtain the final shape of the reinforcing edge.

3. The fabrication method as claimed in claim 2, wherein the blank has a profile that is generally Y-shaped.

4. The fabrication method as claimed in claim 2, wherein the second rough surface is situated on the inside of the blank.

5. The fabrication method as claimed in claim 2, wherein the roughness of the second rough surface lies in the range 1 to 20.

6. The fabrication method as claimed in claim 1, wherein the blank has a profile that is generally Y-shaped.

7. The fabrication method as claimed in claim 1, wherein the second rough surface is situated on the inside of the blank.

8. The fabrication method as claimed in claim 1, wherein the roughness of the second rough surface lies in the range 1 to 20.

9. The fabrication method as claimed in claim 1, wherein the roughness of the second rough surface lies in the range 3 to 10.

10. The fabrication method as claimed in claim 1, wherein the substantially Y-shape of the blank has a diverging inside portion, and the imprinting step includes forming the second rough surface on the diverging inside portion of the blank.

11. The fabrication method as claimed in claim 1, wherein the substantially Y-shape of the blank has a diverging inside portion before the imprinting step, the imprinting step includes forming the second rough surface on the diverging inside portion of the blank, and the imprinting step includes forming the second rough surface on the blank without changing an overall shape of the blank.

12. A fabrication method for fabricating a turbine engine blade, the method comprising the following steps:
   providing a reinforcing edge made using the fabrication method as claimed in claim 1;
   providing a blade body; and
   adhesively bonding all or part of the second rough surface of the reinforcing edge to the blade body.

13. The fabrication method as claimed in claim 12, wherein the blade body is made of organic matrix composite material.

* * * * *